US005474273A

United States Patent [19]
Vinal

[11] Patent Number: 5,474,273
[45] Date of Patent: Dec. 12, 1995

[54] BEVERAGE CONTAINER HOLDER WITH ALTERNATE SUPPORTS

[76] Inventor: Peter S. Vinal, 2301 Ravenhill Dr., Raleigh, N.C. 27615

[21] Appl. No.: 130,276

[22] Filed: Oct. 1, 1993

[51] Int. Cl.$^6$ .................................................. A47K 1/00
[52] U.S. Cl. ..................... 248/311.2; 248/207; 248/126; 248/156
[58] Field of Search ............................... 248/311.2, 156, 248/545, 530, 214, 126, 315, 293, 207; 224/274

[56] References Cited

U.S. PATENT DOCUMENTS

| D. 307,692 | 5/1990 | Shoup . | |
|---|---|---|---|
| D. 319,951 | 9/1991 | Frankel . | |
| 374,737 | 12/1887 | Geils | 248/207 X |
| 2,520,450 | 8/1950 | Austin, Jr. | 248/156 |
| 2,520,818 | 8/1950 | Terry . | |
| 2,649,270 | 8/1953 | Franks | 248/311.2 |
| 2,926,879 | 3/1960 | Dietrich | 248/311.2 |
| 3,116,046 | 12/1963 | Risdon . | |
| 3,306,560 | 2/1967 | Wheeler . | |
| 3,391,891 | 7/1968 | Garder | 248/311.2 |
| 3,463,436 | 8/1969 | Foster | 248/311.2 |
| 3,463,440 | 8/1969 | Libby, Jr. . | |
| 3,734,439 | 5/1973 | Wintz | 248/311.2 X |
| 4,334,661 | 6/1982 | Pitt . | |
| 4,358,083 | 11/1982 | Haubrich | 248/545 |
| 4,887,784 | 12/1989 | Kayali | 248/231.5 X |
| 5,054,726 | 10/1991 | Mattox . | |
| 5,074,506 | 12/1991 | Larsen . | |
| 5,108,058 | 4/1992 | White | 248/207 X |
| 5,186,196 | 2/1993 | Gorka et al. . | |
| 5,187,892 | 2/1993 | Gutierrez | 248/156 X |
| 5,190,257 | 3/1993 | Gradei et al. . | |

FOREIGN PATENT DOCUMENTS

| 4030678 | 3/1980 | Australia . |
|---|---|---|
| 372791 | 5/1932 | United Kingdom . |
| 694752 | 7/1953 | United Kingdom . |
| WO89/05602 | 6/1989 | WIPO . |

*Primary Examiner*—Karen J. Chotkowski
*Attorney, Agent, or Firm*—Bell, Seltzer, Park & Gibson

[57] ABSTRACT

A beverage container holder comprising alternate supports to protect a beverage from contaminates by securing the same in convenient locations and preventing accidental spills. The holder includes a longitudinally extending spine which provides the body of the holder and which contains, at an upper end, connector means and, at an opposite end, at least one stake means. The a connector means comprises a connector through which a tether is threaded to secure the holder on various supports such as lounge chairs, umbrella stands, or the like. Alternatively, an inverted U-shaped clip may be provided to secure the holder to the inside of a car door. The stake comprises prongs to be inserted into ground surfaces such as turf or sand to support the holder upon the ground. The spine also includes rings which surround and secure the beverage within the holder. Both the rings and the stakes may be compacted to provide a collapsible beverage container holder which is easily stored and transported.

11 Claims, 2 Drawing Sheets

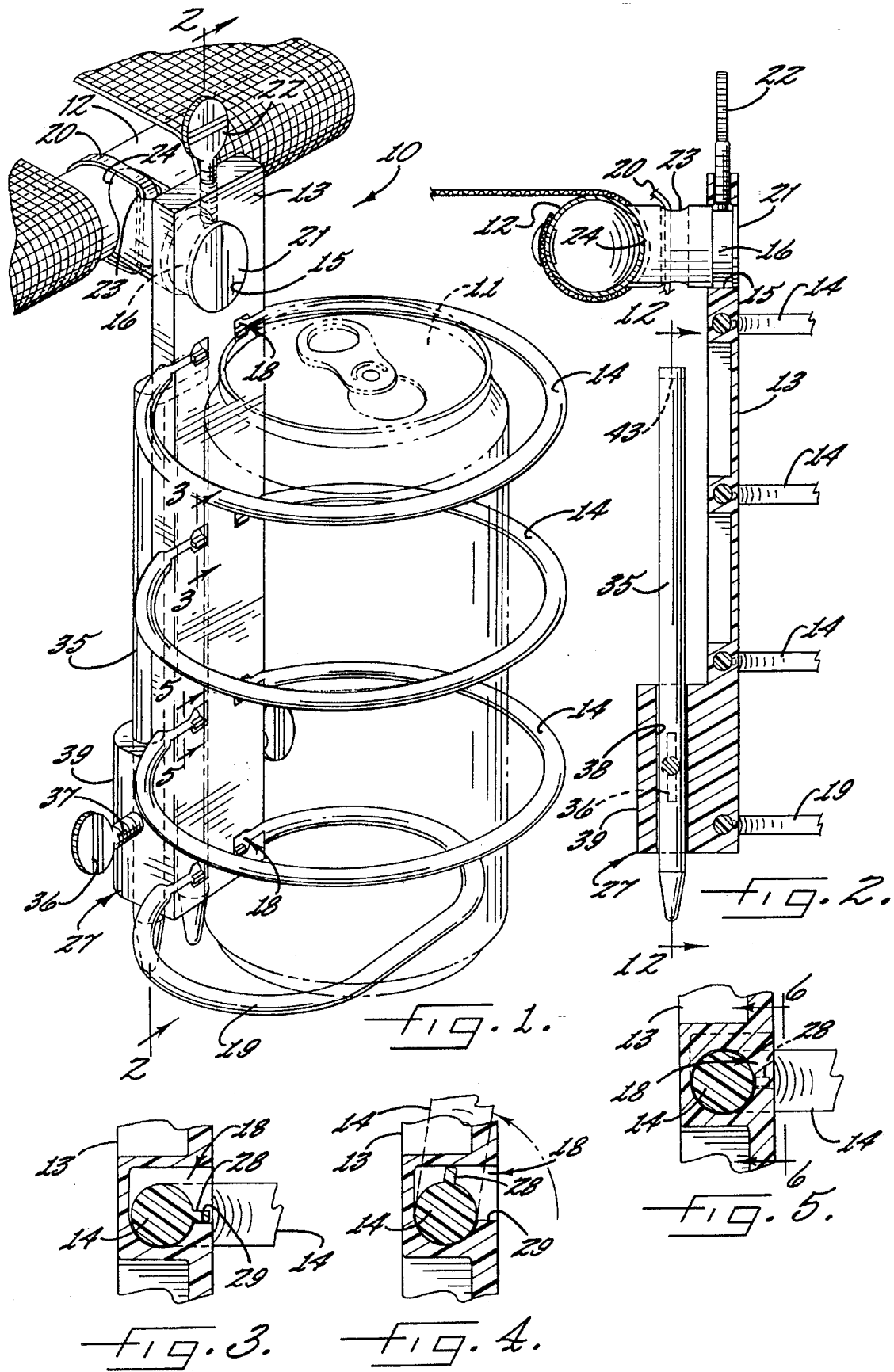

5,474,273

BEVERAGE CONTAINER HOLDER WITH ALTERNATE SUPPORTS

FIELD OF THE INVENTION

The present invention relates generally to a holder for beverage containers.

BACKGROUND OF THE INVENTION

Beverage container holders are particularly useful in environments where dirt, sand or other debris may contaminate the beverage such as when the container is left unattended. Beverage container holders also protect beverages from accidental spills and maintain beverages in convenient locations.

Prior art holders are used to stabilize the beverage container by providing a self-standing holder comprising a stake which penetrates the ground and supports the container thereon. Such stake mounted holders are exemplified by U.S. Pat. No. 4,334,661 to Pitt, Des. U.S. Pat. No. 307,692 to Shoup, and U.S. Pat. No. 2,520,818 to Terry. Other prior art beverage container holders include clamping means to secure the holder to various articles. U.S. Pat. No. 5,190,257 to Gradei et al., U.S. Pat. No. 3,116,046 to Risdon, and Des. U.S. Pat. No. 319,951 to Frankel embody the type of beverage holders which are attached to random supports by various clamping mechanisms.

It is often desirable to use beverage container holders at a beach, but sand tends to create a problem. Often the user has a beach chair or beach umbrella with them but sometimes the user may only have a beach blanket. It is also often desirable to use beverage container holders in a moving vehicle, but spillage creates a problem. Apparently, no prior art holder is effective in these situations.

SUMMARY OF THE INVENTION

The present invention obviates the disadvantages of prior art beverage container holders by providing a holder with alternate support means. The present invention includes a flexible tether to secure the holder to various articles such as lounge chairs or beach umbrellas. Additionally, one or more stakes are provided to penetrate ground surfaces such as turf or beaches, to retain the holder in a self-standing, upright position. Such an arrangement provides a double functioning beverage container holder which can be utilized in nearly all environments.

The container holder of the present invention includes a longitudinally extending spine which supports, at its upper end, a connector through which a flexible tether or tethers extend to secure the holder to various supports such as beach chairs, umbrellas, tables, or the like. Alternatively, a clip may be used to place the container holder on the inside of an automobile door. The connector may be permanently attached to a support, and the connector may be pivotally secured to the spine. Thus, the spine may be adjusted and fixed at any desired angle with respect to the support. Alternatively, the spine may be allowed to pivot relative to the support, to prevent spillage in a boat, car or other moving vehicle.

The spine further comprises, on its opposite end, at least one stake to be inserted into the ground to provide a self-standing support for the beverage. The stake or stakes are slidably connected to the spine such that it extends beyond the stake to a desired length. The holder includes stake length locking means which fastens the stake in place in relation to the spine once a desired stake length is obtained to effectively penetrate the particular ground surface. Additionally, the stake may be completely retracted for easy storage and transportation of the holder.

To support the beverage container on the holder, plural rings are provided which circumferentially surround the container to retain it in position. A bottommost ring is also provided which is smaller in diameter than the bottom of the beverage container such that the container rests thereon. All rings, including the bottom most one, are collapsible from an extended, active position to a folded, inactive position to provide a holder which may easily be carried and stored when not in use. Rings may be retracted individually to accommodate large or small beverage containers. Moreover, the stake also may be completely retracted to further provide a slim-line, collapsible beverage container holder.

It is therefore an object of the present invention to provide a multi-purpose beverage container holder which will effectively protect an unattended beverage in almost all environments.

It is a further object of the present invention to provide a beverage container holder which is adaptive to numerous supporting structures.

It is yet a further object of the present invention to provide a container holder which is self supporting.

It is still a further object of the present invention to provide a container holder which allows rocking movement to prevent beverage spillage in a moving vehicle.

And finally, it is an object of the instant invention to provide a beverage container holder which is easily and readily collapsible for transportation or storage.

BRIEF DESCRIPTION OF THE DRAWINGS

The foregoing and other objects, features, and advantages of the present invention will be made apparent from the following detailed description of the preferred embodiment of the invention and from the drawings, in which:

FIG. 1 is a perspective view of a beverage container holder according to the present invention illustrating the holder attached to a support.

FIG. 2 is a vertical sectional view taken at line 2—2 of FIG. 1.

FIG. 3 is a vertical sectional view taken at line 3—3 of FIG. 1 which illustrates the rings in an extended, active position to support the beverage container.

FIG. 4 is a vertical sectional view of the same rings as in FIG. 3, but which are in a folded, inactive position, for storage or for use with shorter beverage containers.

FIG. 5 is a vertical sectional view taken at line 5—5 of FIG. 1.

DETAILED DESCRIPTION OF A PREFERRED EMBODIMENT

Figure 6:
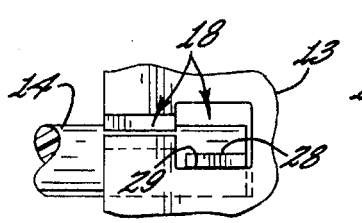
FIG. 6 is a fragmentary view taken at line 6—6 of FIG. 5.

The present invention will now be described more fully with reference to the accompanying drawings wherein like numerals reference like elements. While the preferred embodiments of the invention are shown to convey the scope of the invention, the present invention should not be construed as limited to the embodiments set forth herein.

A beverage container holder according to the present invention, indicated generally at 10, supports a beverage container 11 to secure and protect the beverage from contaminates and accidental spills. As shown in FIG. 1, the holder 10 retains the beverage container 11 upon a support such as a crossbar 12 of a lounge chair as shown. Alternatively, the holder 10 may be supported upon a ground surface such as grass or sand by stake means indicated at 27.

To support and retain the beverage container 11, the holder 10 is provided with circumferential rings 14 which surround and secure the container 11. Three rings 14 are shown, although any number may be provided. The rings may all be retracted for storage, or individual rings may be retracted to accommodate shorter beverage containers. Base ring 19 is also provided upon which beverage container 11 rests. The circumferential rings 14 and base ring 19 are located on the spine 13 of the holder 10. Spine 13 is longitudinally extending and provides the support and body to the holder 10.

Figure 14:
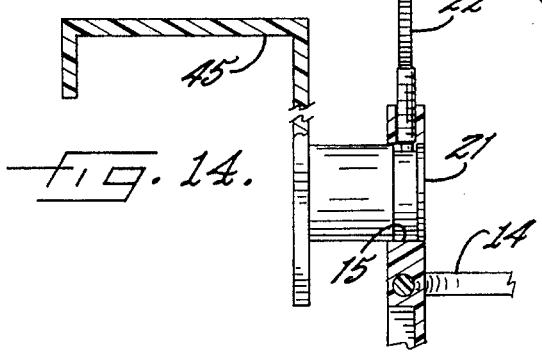
FIG. 14 is a fragmentary, partially cut away view of an alternate embodiment of the connector means of FIG. 1.

The manner of securing the holder 10 to a support will now be described in detail. As seen in FIGS. 1–2 and 10–11, the holder 10 may be attached to a support 12 such as the cross bar of a lounge chair. Coupled to the spine 13 is a connector 21 which possess a set of bores, indicated at 23, through which flexible tether 20 extends so that tether 20 may be threaded through bore 23 and tied around the support 12 in any conventional manner. Tether 20 can accommodate any diameter support 12. Multiple tethers and bores may be used. Alternatively, as illustrated in FIG. 14, connector 21 may include an inverted U-shaped clip 45 for securing the holder 10 to the inside of a car door.

Figure 10:
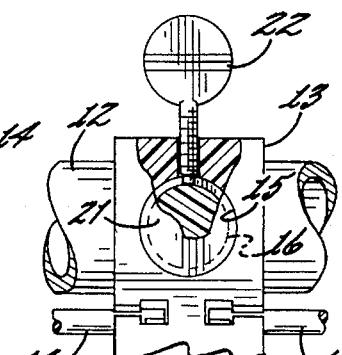
FIG. 10 is a fragmentary, partially cut away view of the connector locking means.
Figure 11:
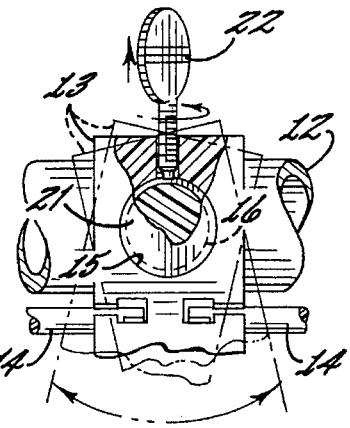
FIG. 11 is a fragmentary, partially cut away view of the connector locking means capable of holding the beverage at various angles.

Spine 13 comprises a hole 15 through which connector 21 is removably inserted. Connector 21 is retained within the hole 15 of the spine by connector locking means 22 which, in the most preferred embodiment, consists of a threaded screw inserted through the top of the spine 13 perpendicular to the length of connector 21 such that it urges against the indented surface, indicated at 16, of connector 21 to retain the connector within spine 13. Moreover, connector 21 is provided with an arcuate outer surface 24 to conform to rounded support surfaces such as lounge chair cross bars or umbrella stands. As shown in FIGS. 10 and 11, the connector 21 inserted within hole 15 of the spine 13 is rotatable so supports at varying angles can be used to support the holder 10. Alternatively, the connector 21 can rock in hole 15 to prevent spillage in a moving vehicle. Support 12 shown possesses a horizontal cross bar upon which holder 10 is secured, but if it were not horizontal, the connector 21 may be loosened by unscrewing the connector locking means 22 so that the spine 13 may be rotated to the desired angle in relation to the connector and connector locking means 22 may be tightened to maintain the desired angle. Alternatively, connector locking means 12 may only be partially tightened so that spine 13 rocks with movement of the support, for example to prevent beverage spillage in a moving vehicle.

Circumferential rings 14 retain beverage container 11 by loosely encircling the same as depicted in FIG. 1. The rings are preferably large enough to encircle conventional beverage containers, with or without an insulating "hugger" thereon. The rings 14 are inserted within slots 18 provided in the spine 13 and, as shown in the various figures, rings 14 are not completely circular but, rather possess a break to allow insertion into and removal from slots 18. Specifically, the rings 14 include a tab 28 at each end to limit excessive rotation of the rings 14 within the spine 13. For instance, FIG. 3 depicts a ring 14 in an extended, active position to retain beverage container 11. Tab 28 thereby abuts the surface 29 to prevent the rings from folding or falling downward and accordingly provide sturdy support and protection to the beverage container 11.

When it is desired to fold the holder 10 such as for transportation or storage, the beverage container 11 is removed, the sides of each ring 14 are pressed inward so as to squeeze the ends of the ring together and rings 14 may be rotated upward. Requiring that the ends of the rings be compressed prior to rotation prevents the rings 14 from being unintentionally folded. Alternatively, squeezing may not be required so that the rings move freely. As seen in FIG. 1, if the ends of ring 14 were not compressed, tab 28 would abut the upper surface of slot 18 and rotation would be prohibited. By compressing the ends, rings 14 may be rotated upward to assume the position of FIG. 4 which illustrates, in cross section, ring 14 in the folded, inactive position.

Figure 7:
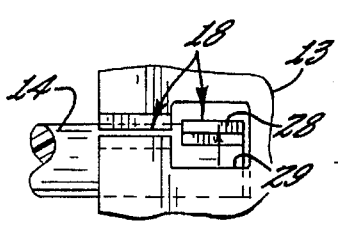
FIG. 7 is a fragmentary view similar to FIG. 6 but which shows the support ring in a folded, inactive position.
Figure 8:
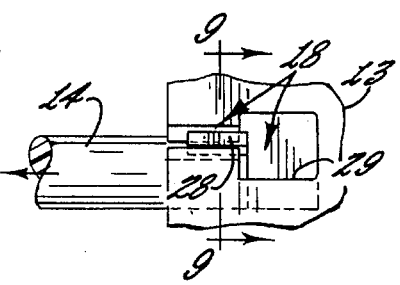
FIG. 8 similarly shows a fragmentary view as in FIGS. 6 and 7 wherein the ring structure is positioned for removal from the spine.
Figure 9:
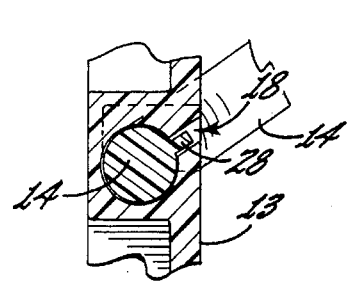
FIG. 9 is a vertical sectional view taken at line 9—9 of FIG. 8.

If disassembly is desired, rings 14 may be removed by aligning tabs 28 with the length of slot 18 and separating the ends of ring 14 until it is removed from the spine 13. This arrangement is shown in cross section in FIG. 9. As portrayed in FIGS. 6–8, the ends of rings 14 may not be removed from the spine 13 in either the extended, active position or the folded, inactive position because the tab 28 will not be aligned with the length of slot 18. FIG. 5 illustrates rings 14 in the extended, active possession wherein the tab is obstructed by the confines of slot 18 and as such may not be removed. Unintentional removal of the rings will thus be avoided. FIG. 9 portrays rings 14 rotated slightly upward such that tabs 28 are aligned with slots 18 and which may be removed.

Base ring 19 operates similarly to circumferential rings 14 in its ability to rotate, fold, and be removed. However, the configuration of base ring 19 is dissimilar to rings 14 in that it possesses a smaller diameter, measured outward from spine 13, to support the beverage container 11. In the most preferred embodiment of the invention, base ring 19 is oblong such that the container 11 rests thereupon.

Figure 12:
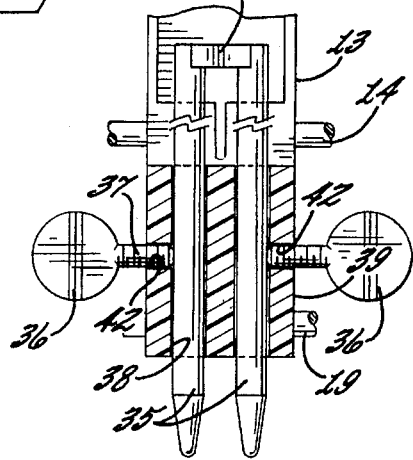
FIG. 12 is a fragmentary, sectional view taken at line 12—12 of FIG. 2 portraying the stake length locking means.
Figure 13:
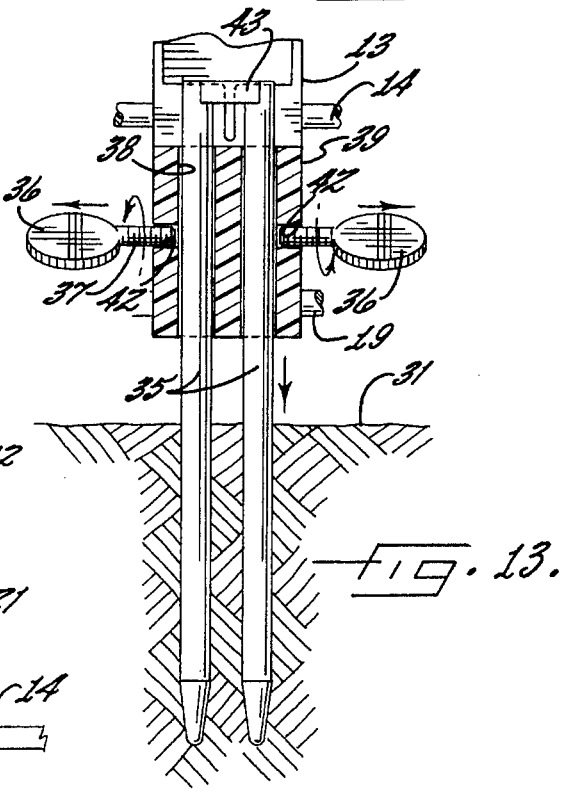
FIG. 13 is a fragmentary, sectional view similar to FIG. 12 illustrating the stake support means in an extended, engaging position.

Located on the bottom most end of spine 13 is stake supporting means 27 which permits holder 10 to be self supporting upon any soft ground surface 31 such as grass or sand. FIGS. 1 and 2 demonstrate stake means 27 in a compacted, inactive position such as when holder 10 is attached to a support 12 utilizing tethers 20 or when the holder 10 is folded for transportation or storage. FIGS. 12 and 13 precisely depict the most preferred form of the stake support means 27. Stake 27 includes prongs 35 which penetrate ground surfaces to support the holder in the ground 31. Prongs 35 removably extend through longitudinally extending bores 38 located within thickened area 39 of spine 13.

Stake support means 27 also includes stake length locking means, indicated generally at 36, to selectively preserve the desired length of the prongs 35. This is particularly desirable because looser surfaces such as sand would require a longer stake supporting means to support the beverage container 11 than would a harder surface such as grass. Stake length locking means 36 comprises threaded screws 37 which extend through correspondingly threaded bores 42 located on both sides of spine 13 and which run perpendicular to the length of the prongs 35. By such an arrangement as depicted in FIG. 12, screws 37, when tightened, will be urged against the surface of prongs 35 and retain the same in position. If it is desirable to alter the length of the stake support means 27 or to compact the holder, screws 37 are loosened, prongs 35 are either extended or compacted until they are in the desired position, and screws 37 may be tightened to maintain the same. This is best illustrated in FIG. 13. Prongs 35 are connected by cross bar 43 which prevents over-extension of the prongs 35 and removal of the stake 27 from the spine 13 in that direction. Of course, removal of the stake 27 is permitted if the screws are loosened by pulling the stake 27 upward instead of downward. Again, unintentional removal of components is avoided.

The beverage container holder 10 of the present invention may be formed of any rigid or semi-rigid material known to a skilled artisan. In the most preferred embodiment, though, the components of the holder 10 are formed of a plastic material due to ease of manufacturing and low cost. Plastic materials are desirable because they provide the support necessary for the spine 13 and also the flexibility required by rings 14 and 19 to permit rotation and removal.

It is thus apparent that the present invention provides a secure support for beverages in almost any environment. Moreover, the present invention provides a beverage holder 10 which is easily manipulated and efficiently stored. While particular embodiments of the invention have been described, it will be understood that the invention is not limited thereto since modifications may be made by those skilled in the art, particularly in light of the foregoing teachings. It is therefore contemplated by the appended claims to cover any such modifications as incorporate those features or these improvements within the true spirit and scope of the invention.

That which is claimed:

1. A holder for supporting a beverage container comprising:
   a longitudinally extending spine including securement means for supporting a beverage container within said holder;
   said spine further including a first mounting to releasably secure said holder to a support and a second mounting comprising a stake to support said holder upon a ground surface such that plural means of support are provided; said first mounting comprising:
   a flexible tether coextensive with said spine to secure the holder to the support;
   a connector, said connector including a bore which receives said tether to releasably secure said holder to a support; and
   means for rotationally mounting said connector on said spine to facilitate support at varying angles, and to facilitate movement of said spine in response to movement of said support.

2. A holder for supporting a beverage container as in claim 1 wherein:
   said stake comprises at least one prong to penetrate the ground surface.

3. A holder for supporting a beverage container as in claim 1 wherein:
   said securement means to support the beverage container comprises at least one ring connected with the spine dimensioned to surround the beverage container, said means to support the beverage container further comprising a rest to support the beverage container.

4. A holder for supporting a beverage container as in claim 1 wherein said connector comprises an arcuate shaped outer surface to abut support surfaces which are rounded.

5. A holder for supporting a beverage container as in claim 2 wherein said at least one prong is moveable from a folded, inactive position to an extended, active position such that in the active position, said at least one prong may penetrate the ground surface a depth sufficient to support said beverage container.

6. A holder for supporting a beverage container as in claim 5 wherein said stake is retained at a desirable position by stake length locking means.

7. A holder for supporting a beverage container as in claim 2 wherein said securement means comprises plural rings which surround said beverage container.

8. A holder for supporting a beverage container as in claim 7 wherein said plural rings are collapsible from an extended, active position to a folded, inactive position to permit ease of storage.

9. A holder for supporting a beverage container as in claim 8 wherein said collapsible rings comprise means for limiting accidental folding of said rings.

10. A holder for supporting a beverage container as in claim 8 wherein said rings and said stake comprise means for preventing unintentional removal and folding.

11. A beverage container holder comprising:
    means for securing a beverage container;
    clamping means, attached to said securing means, for releasably clamping said holder to a support; and
    at least one stake attached to said securing means to support said holder upon a ground surface, such that plural means of support are provided;
    wherein said clamping means comprises:
    a flexible tether;
    a connector including a bore which receives said tether to releasably secure said holder to a support; and
    means for rotationally mounting said connector to said securing means to facilitate support at varying angles, and to facilitate movement of said securing means in response to movement of said support.

* * * * *